US011984003B2

(12) United States Patent
Udumalagala et al.

(10) Patent No.: US 11,984,003 B2
(45) Date of Patent: *May 14, 2024

(54) DEVICE FOR AUTOMATED REMOVAL OF SECURITY TAGS AND ASSOCIATED SYSTEMS AND METHODS

(71) Applicant: Kohl's, Inc., Menomonee Falls, WI (US)

(72) Inventors: Stefan Udumalagala, San Jose, CA (US); Supun Dewaraja, Menomonee Falls, WI (US); Kiran Ramaraju, Menomonee Falls, WI (US); Mark Michalski, Menomonee Falls, WI (US); Neetu Goyal, Foster City, CA (US)

(73) Assignee: Kohl's, Inc., Menomonee Falls, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/887,401

(22) Filed: Aug. 12, 2022

(65) Prior Publication Data

US 2023/0036860 A1 Feb. 2, 2023

Related U.S. Application Data

(63) Continuation of application No. 17/070,789, filed on Oct. 14, 2020, now Pat. No. 11,417,186.

(60) Provisional application No. 62/914,868, filed on Oct. 14, 2019.

(51) Int. Cl.
*G08B 13/24* (2006.01)

(52) U.S. Cl.
CPC ...... *G08B 13/2411* (2013.01); *G08B 13/2434* (2013.01); *G08B 13/2465* (2013.01)

(58) Field of Classification Search
CPC ............ G08B 13/2411; G08B 13/2434; G08B 13/2442; E05B 73/0017; E05B 17/2088
See application file for complete search history.

(56) References Cited

U.S. PATENT DOCUMENTS

| | | | | |
|---|---|---|---|---|
| 11,417,186 | B2 | 8/2022 | Udumalagala et al. | |
| 2006/0016885 | A1* | 1/2006 | Roberts ............. | G08B 13/2402 235/383 |
| 2016/0260302 | A1* | 9/2016 | Ellers ................. | G08B 13/2434 |
| 2020/0256093 | A1* | 8/2020 | Chandramowle ... | E05B 17/2092 |
| 2021/0097834 | A1* | 4/2021 | Alexis ................ | G08B 13/2434 |

* cited by examiner

*Primary Examiner* — Mirza F Alam
(74) *Attorney, Agent, or Firm* — Perkins Coie LLP

(57) ABSTRACT

Devices, systems, and methods for removing a security tag from an article are disclosed herein. A device for removing a security tag includes a housing including an opening positioned to receive the tag and at least a portion of the article. A magnet is supported adjacent the opening to retain a tag body and to release a retainer pin therefrom when the tag is inserted into the opening. A pin retractor is positioned in the housing opposite the magnet to capture the retainer pin and retract it from the tag body. The pin retractor is retracted into a collar to strip the pin from the pin retractor. A release frame is positioned proximate the magnet and movable between a first position wherein the magnet retains the tag body, and a second position wherein the tag body is moved away from the magnet, thereby releasing the tag body from the magnet.

20 Claims, 17 Drawing Sheets

DEVICE FOR AUTOMATED REMOVAL OF SECURITY TAGS AND ASSOCIATED SYSTEMS AND METHODS

CROSS-REFERENCE TO RELATED APPLICATION(S)

This application is a continuation of U.S. patent application Ser. No. 17/070,789 filed Oct. 14, 2020, which claims priority to and the benefit of U.S. Provisional Application No. 62/914,868, filed Oct. 14, 2019, both of which are incorporated herein by reference in their entirety.

TECHNICAL FIELD

The present technology is generally directed to devices for removing a security tag from a retail item. In particular, several embodiments of the present technology are related to devices for automatically removing security tags from a retail item to facilitate self-checkout in a retail setting.

BACKGROUND

In retail checkout systems, a sales associate is needed to properly remove an electronic article surveillance (EAS) security tag from a purchased item. An EAS security tag is removed by manually placing the tag into a universal magnetic security tag detacher in a process that is time consuming and requires specific training to accomplish.

DETAILED DESCRIPTION

Figure 1:
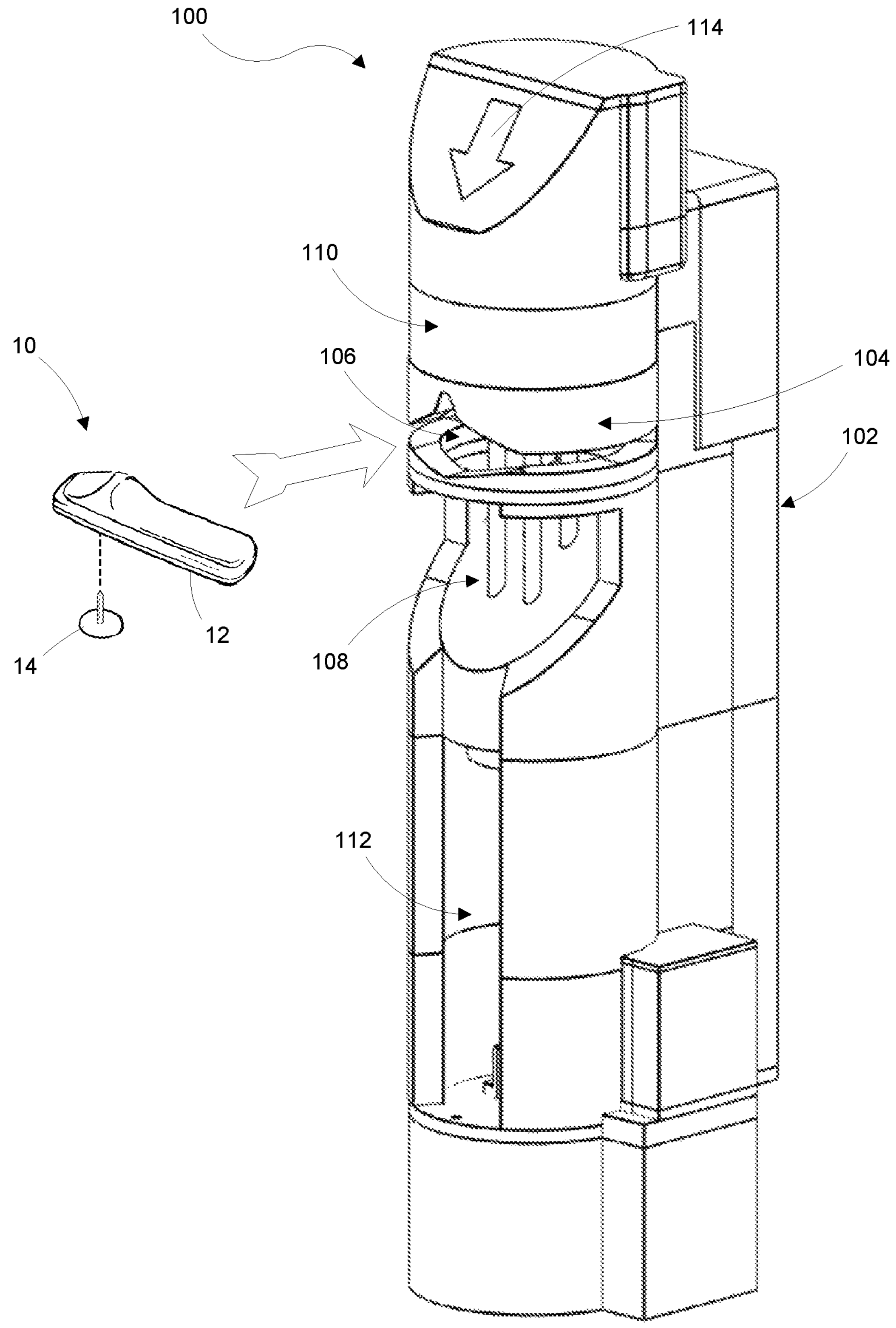
FIG. 1 is an isometric view of a device for removing a security tag configured in accordance with embodiments of the present technology.

The present disclosure is directed generally toward devices for automated removal of security tags and associated systems and methods. The disclosed devices, systems, and methods allow customers to safely and efficiently remove electronic article surveillance (EAS) security tags and EAS ink security tags from retail items (e.g., apparel) without the assistance of a sales associate. With current techniques, in one example, a single tag removal can take approximately 20 seconds with approximately 700 tags removed per day. This amounts to almost four hours of sales associate time per day. Thus, the disclosed technology allows significant savings in employee time and facilitates providing an associate free self-checkout experience for customers.

Devices for automated removal of security tags (also known as "detachers" and "detaggers") in accordance with the present technology can include a housing having an opening positioned to receive the security tag and at least a portion of an article secured by the tag. A magnet can be supported in the housing adjacent the opening and operative to retain the tag body and to release the retainer pin from the tag body when the security tag is inserted into the opening. A pin retractor can be positioned in the housing opposite the magnet and operative to capture the retainer pin and retract it from the tag body. A release frame can be positioned proximate the magnet and movable between a first position wherein the magnet retains the tag body, and a second position wherein the tag body is moved away from the magnet, thereby releasing the tag body from the magnet. In some aspects of the present technology, the device can include one or more sensors positioned proximate the opening to detect an article inserted into the opening in order to activate tag removal. In other aspects of the present technology, the pin retractor can include one or more retractor rods, each including a retractor magnet positioned on a distal end, and a collar wherein the one or more retractor rods extend through the collar. In some implementations, the collar includes a surface oriented at an angle with respect to the one or more retractor rods such that a security tag pin captured by the retractor magnets is stripped off of the magnets as the rods are retracted into the collar.

Certain details are set forth in the following description and in FIGS. 1-18 to provide a thorough understanding of various embodiments of the present technology. For example, numerous embodiments of devices and systems for automated removal of security tags are described with respect to customer self-checkout in a retail setting. However, the embodiments disclosed herein can be used in any suitable setting and are not to be limited to use by customers but can be used by sales associates and other personnel as appropriate. In other instances, well-known structures, materials, operations and/or systems often associated with electro-mechanical systems—such as sensors, actuators, fasteners, connecting devices, etc.—are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention.

Many of the details, dimensions, angles, and other features shown in the Figures are merely illustrative of particular embodiments of the disclosure. Accordingly, other embodiments can have other details, dimensions, angles, and features without departing from the spirit or scope of the present technology. In addition, those of ordinary skill in the art will appreciate that further embodiments of the invention can be practiced without several of the details described below.

I. SELECTED EMBODIMENTS OF DEVICES FOR AUTOMATED REMOVAL OF SECURITY TAGS AND ASSOCIATED SYSTEMS AND METHODS

Several implementations are discussed below in more detail with reference to the figures. FIG. 1 illustrates a device 100 (also referred to as a "tag removal device") for removing a security tag 10 configured in accordance with embodiments of the present technology. The security tag 10 can be an EAS style security tag, having a tag body 12 and a retainer pin 14. The tag body 12 can house an RFID and the retainer pin 14 is inserted through an article or retail item (not shown), such as the fabric of a garment, and into the tag body 12 to secure the tag to the article. The retainer pin 14 is captured in the tag body 12 by one of various mechanisms as known in the art. In any case, the retainer pin 14 can be released from the tag body 12 by positioning the tag body 12 against a magnet, whereby the retainer pin 14 can be retracted from the tag body 12.

The device 100 can include a housing 102 having a tag guide 104 with an opening 106 positioned to receive the security tag 10 and at least a portion of the article (not shown). As described more fully below, the housing 102 carries a pin retractor mechanism 108 and a release frame mechanism 110, which cooperate to remove the security tag 10 from the article. In some embodiments, the housing 102 includes a collection bin 112 to contain the tag bodies 12 and the retainer pins 14 as they fall by gravity into the bin.

The device 100 can also include a visual indicator, such as notification arrow 114, to guide a user (e.g., a customer) on how to identify the operation stages for insertion and removal. For example, in one implementation a green arrow can indicate that the device 100 is active and ready to be used (Stage 1), a blue arrow can indicate that the device 100 is in the process of removing the pin or the tag (Stage 2), and a blinking green arrow can indicate that the article is ready to be removed from the device 100 (Stage 3). A blinking red arrow can indicate an error has occurred (Stage 4) and a yellow arrow can indicate that the article is not inserted far enough into the opening (Stage 5).

Figure 2:
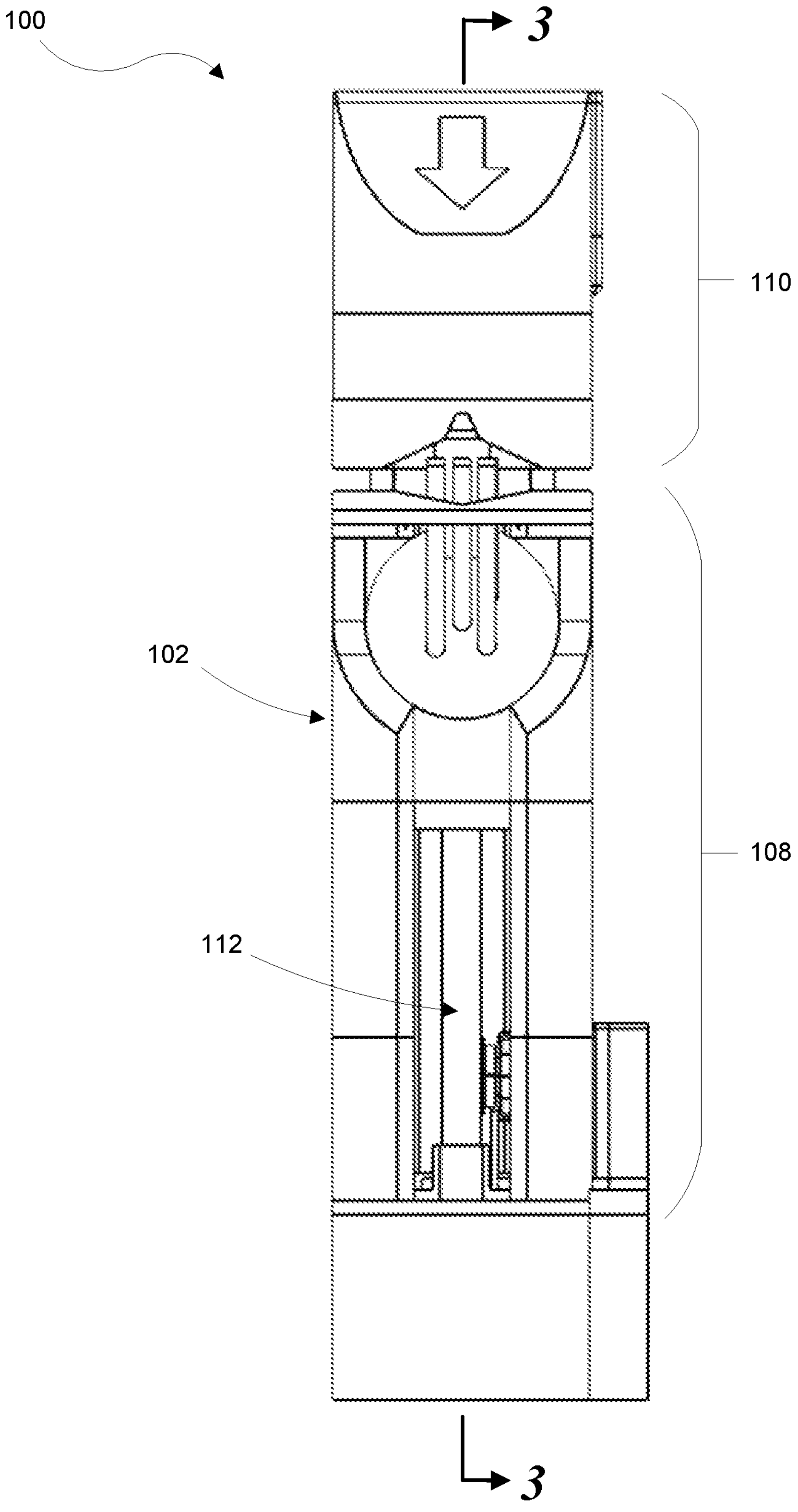
FIG. 2 is a front elevational view of the device shown in FIG. 1.

As shown in FIG. 2, an upper portion of the housing 102 contains the release frame mechanism 110 and a lower portion of the housing 102 contains the pin retractor mechanism 108. The housing 102 can further include a removable cover (not visible) enclosing the lower portion of the housing 102 including the pin retractor mechanism 108 and the collection bin 112. In some embodiments, the cover comprises a clear plastic material or the like.

Figure 3:
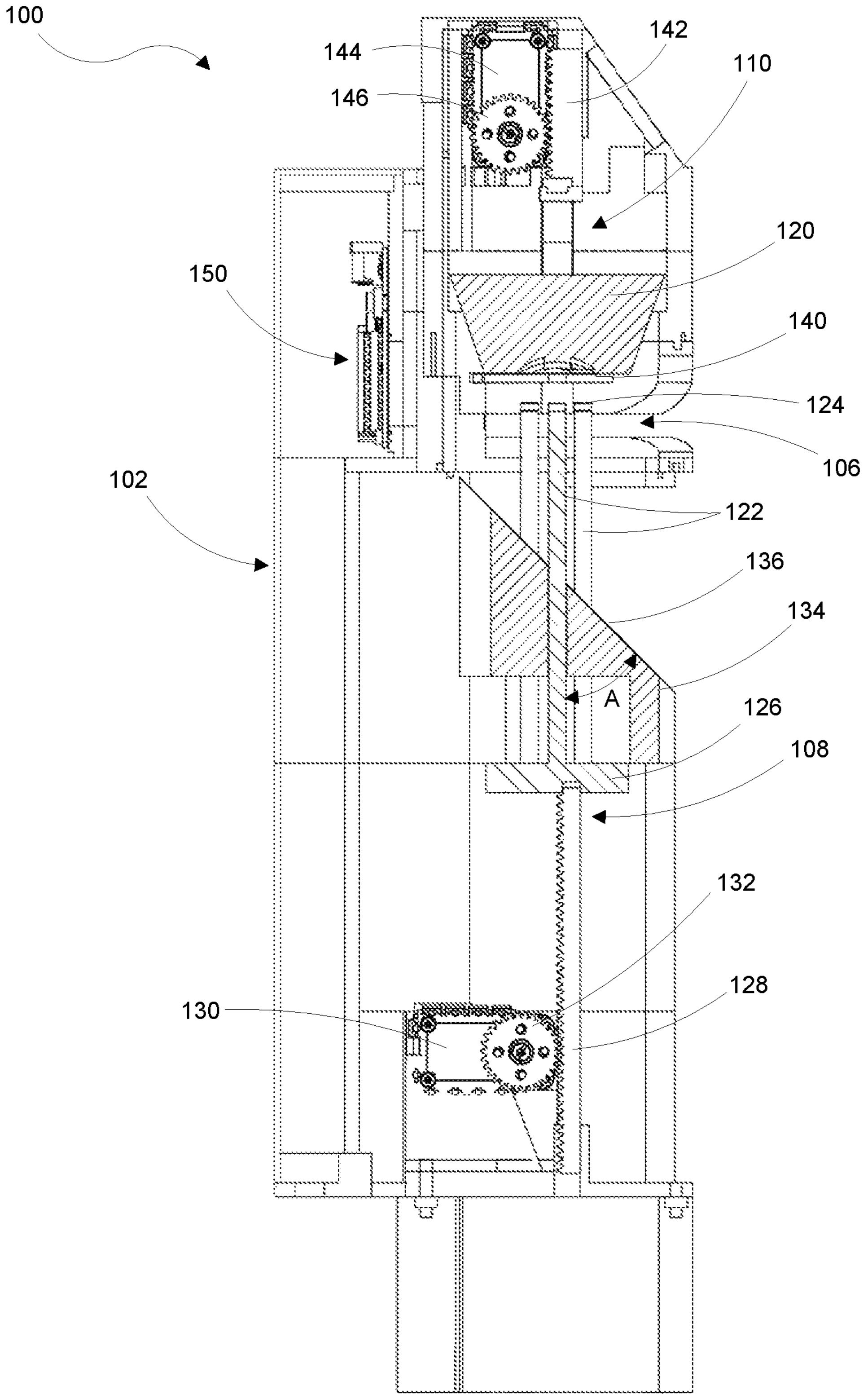
FIG. 3 is a cross-sectional view of the device shown in FIG. 2 as taken about line 3-3.

Turning to FIG. 3, a magnet 120 is supported in the housing 102 adjacent the opening 106 and is operative to retain the tag body 12 and to release the retainer pin 14 from the tag body 12 when the security tag 10 is inserted into the opening 106 (FIG. 1). In some implementations, the magnet 120 can be a neodymium magnet. The pin retractor mechanism 108 is positioned in the housing 102 opposite the magnet 120 and is operative to capture the retainer pin 14 and retract it from the tag body 12. The pin retractor mechanism 108 can include one or more retractor rods 122 (e.g., five rods), each including a retractor magnet 124 positioned on a distal end thereof. The retractor rods 122 can be carried on a base plate 126 which is in turn moved toward or away from the magnet 120 by activating an actuator, such as rotary actuator 130. The actuator 130 is coupled to the base plate 126 via a pinion gear 132 and a gear rack 128 engaging the pinion gear 132. The retractor rods 122 extend through a collar 134 having a surface 136 oriented at an angle A (e.g., 45 degrees) with respect to the one or more retractor rods 122.

The release frame mechanism 110 includes a release frame 140 positioned proximate the magnet 120. As explained more fully below, the release frame 140 is movable between a first position wherein the magnet 120 retains the tag body 12, and a second position wherein the tag body 12 is moved away from the magnet 120, thereby releasing the tag body 12 from the magnet 120. A frame actuator, such as rotary actuator 144, can be coupled to the release frame 140 for moving the release frame between the first and second positions. The frame actuator 144 can be coupled to a pinion gear 146, and a gear rack 142 engaging the pinion gear and coupled to the release frame 140.

The device 100 can include a controller 150 enclosed in the housing 102 for operating the actuators and communicating with a point-of-sale system (POS), for example. The controller can include at least one memory device for storing instructions and at least one processor, micro-processor, or micro-controller, for example.

Figure 5:
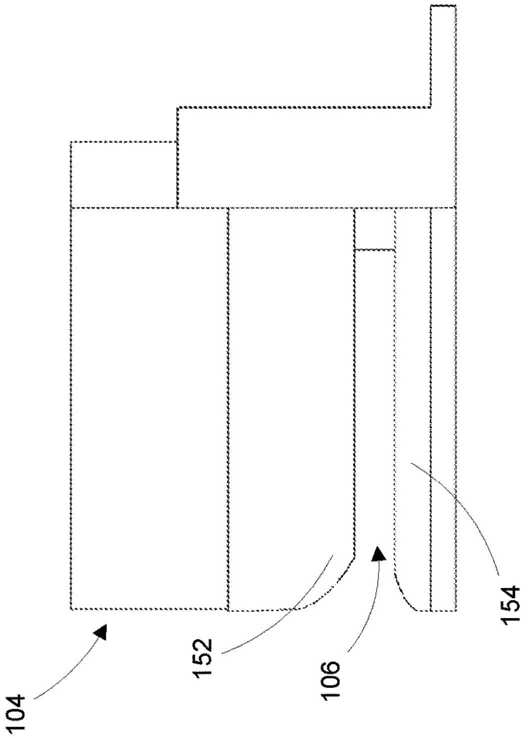
FIG. 5 is a side elevational view of the tag guide shown in FIG. 4.
Figure 4:
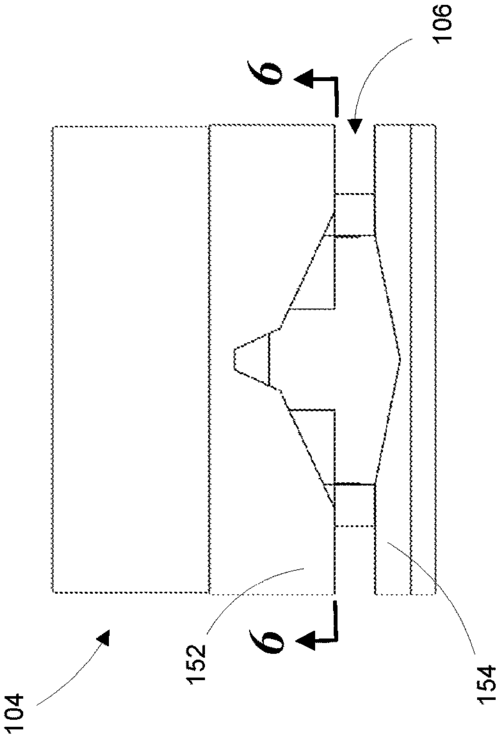
FIG. 4 is a front elevational view illustrating a tag guide for the device shown in FIGS. 1-3.
Figure 6:
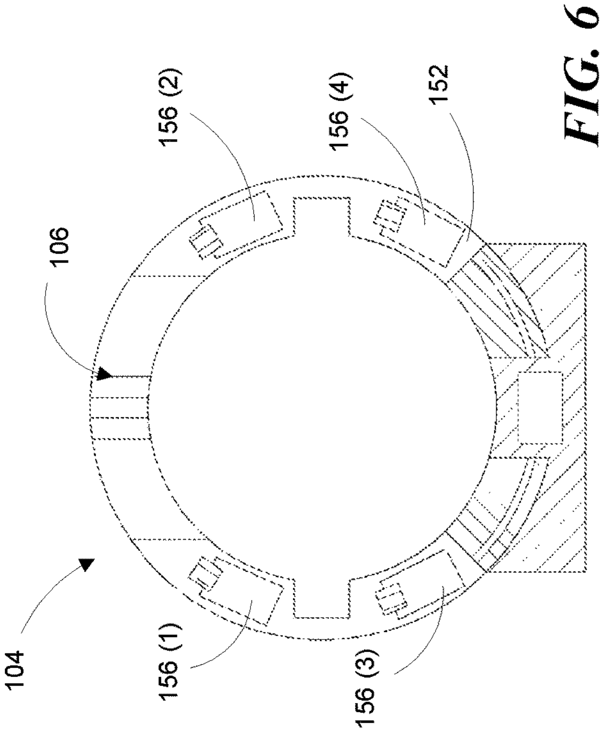
FIG. 6 is a cross-sectional view of the tag guide shown in FIG. 4 as taken about line 6-6.

With reference to FIGS. 4-6, the tag guide 104 includes an upper lip 152 and a lower lip 154 with the opening 106 positioned therebetween. The upper and lower lips 152 and 154 are configured to help guide the security tag 10 (FIG. 1) into the opening 106 and into position against the magnet 120. As shown in FIG. 6, the upper lip 152 can carry one or more sensors 156(1)-(4) positioned proximate the opening.

The sensors 156(1)-(4) are positioned to detect when an item (e.g., a garment) has been fully inserted into the opening 106. Once the item is fully inserted, the controller 150 can activate the actuators 130 and 144 (FIG. 3). If for example, one or both of the rear most sensors (i.e., 156(3) and/or 156 (4)) fails to detect the item, the controller 150 can indicate via notification arrow 114 that the item is not fully inserted (e.g., yellow arrow) and/or indicate that a foreign object is in the opening (e.g., red blinking arrow) (FIG. 1). In other words, if all four sensors 156(1)-(4) do not sense the item, the system will not activate to remove the security tag 10 (FIG. 1). In some implementations the sensors can be infrared (IR) sensors, proximity sensors, photoelectric sensors, laser sensors, or any sensor suitable to detect the presence of an item.

Figure 8:
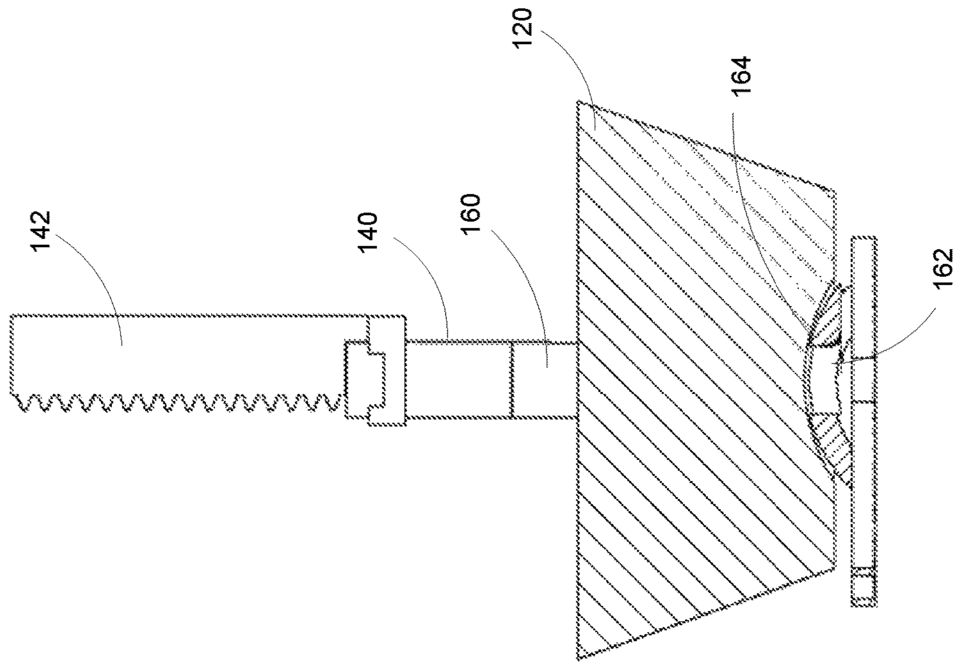
FIG. 8 is a cross-sectional view of the release frame and magnet shown in FIG. 7 as taken about line 8-8.
Figure 7:
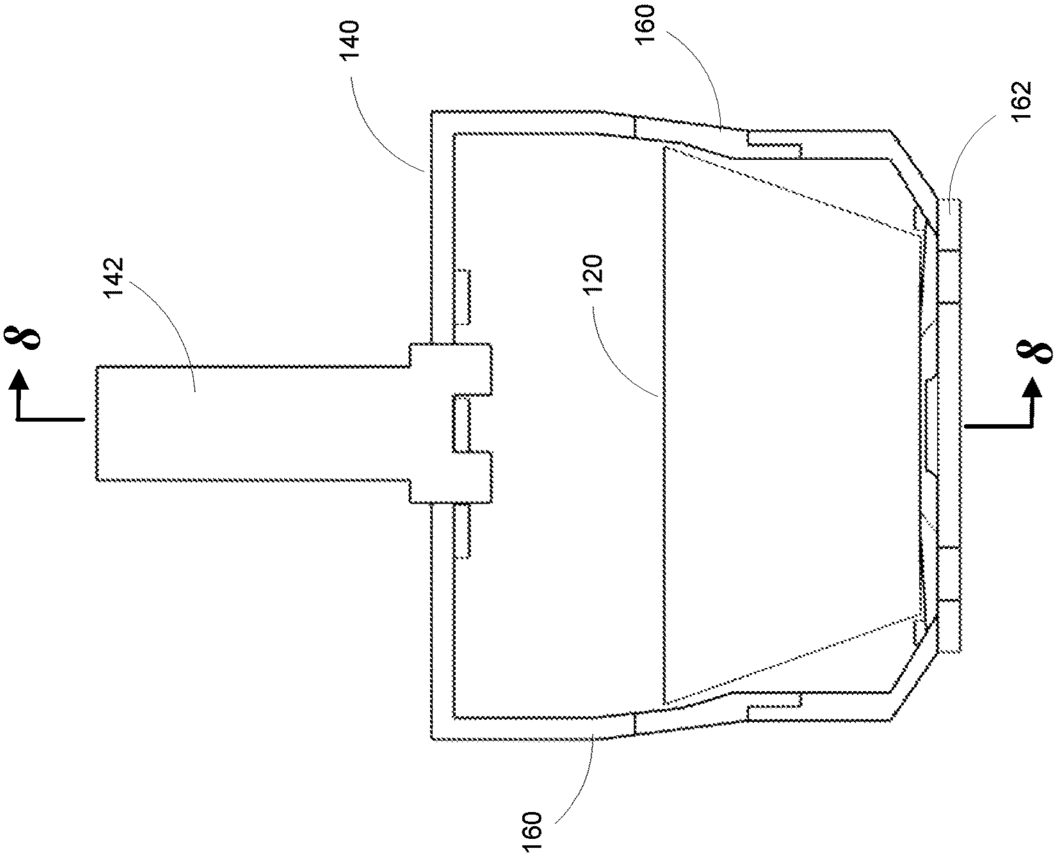
FIG. 7 is a front elevational view illustrating a release frame and magnet for the device shown in FIGS. 1-3.

FIGS. 7 and 8 illustrate the relationship between the magnet 120 and the release frame 140. The release frame 140 can comprise a pair of arms 160 and a tag holder 162 carried by the arms 160. With reference to FIG. 8, the tag holder 162 nests into a concave region 164 formed in the magnet 120. The tag holder 162 helps properly position the security tag 10 relative to the magnetic field of the magnet 120 to release the retainer pin 14 from the security tag 10.

Figure 10:
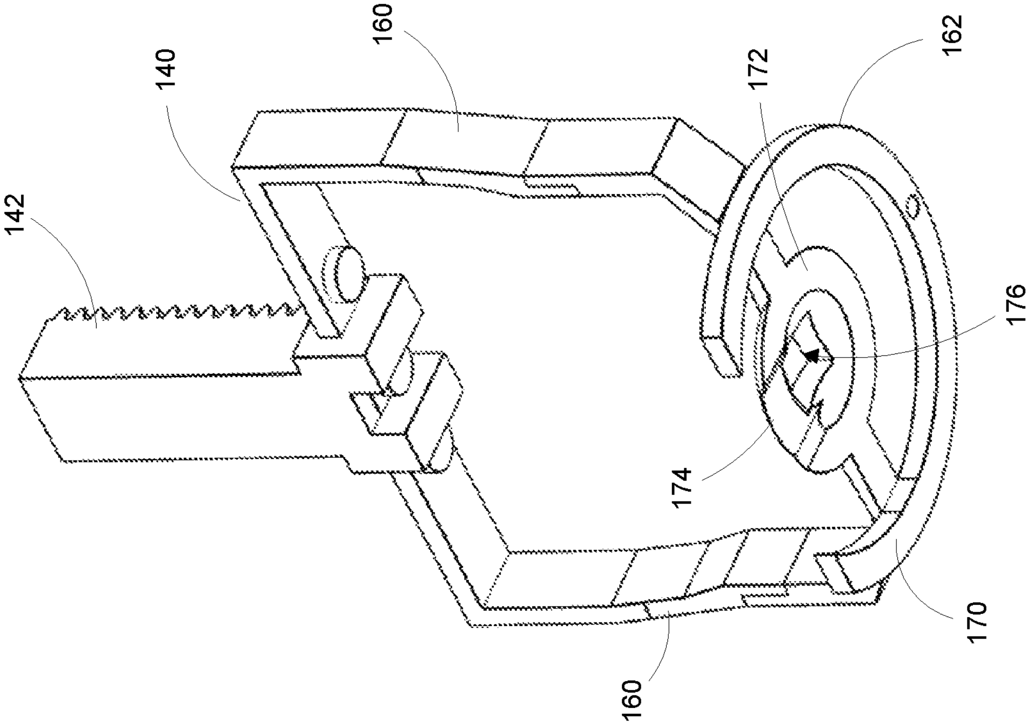
FIG. 10 is an enlarged bottom isometric view of the release frame shown in FIGS. 7-9.
Figure 9:
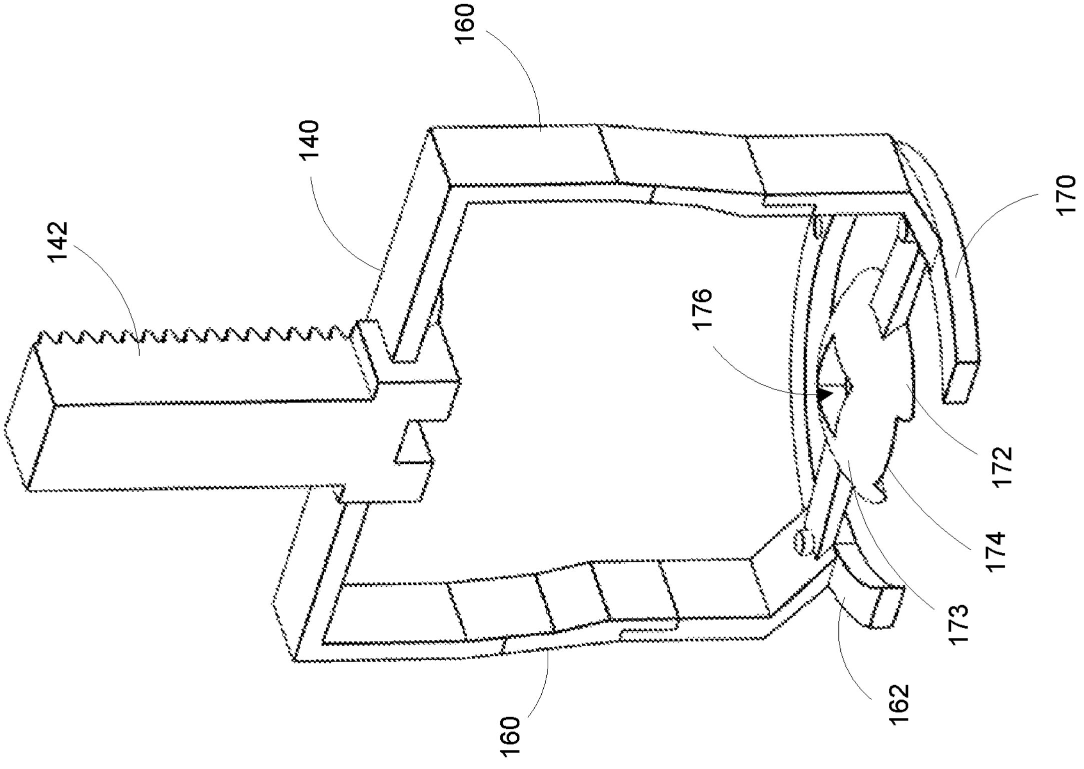
FIG. 9 is an enlarged top isometric view of the release frame shown in FIGS. 7 and 8.

Turning to FIGS. 9 and 10, the tag holder 162 can include a partial ring portion 170 at least partially surrounding a pilot fitting 172. The pilot fitting 172 can have an upper convex surface 173 sized and configured to mate with the concave region 164 of the magnet 120. The pilot fitting 172 can also include a pilot aperture 176 positioned to receive the tag body 12 and properly position it relative to the magnet 120. A pilot channel 174 is formed in a bottom side of the pilot fitting 172, and in conjunction with the ring portion 170, acts to index the tag body 12 with respect to the pilot aperture 176.

Figure 11A:
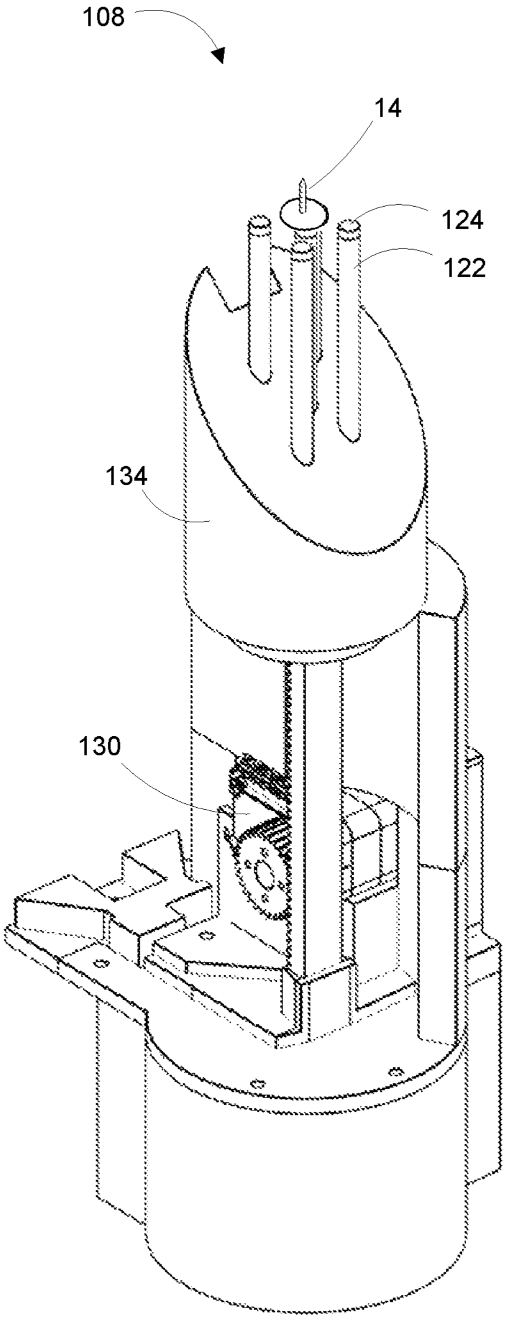
FIGS. 11A and 11B are partially assembled isometric views illustrating the operation of a pin retractor mechanism for the device shown in FIGS. 1-3.
Figure 11B:
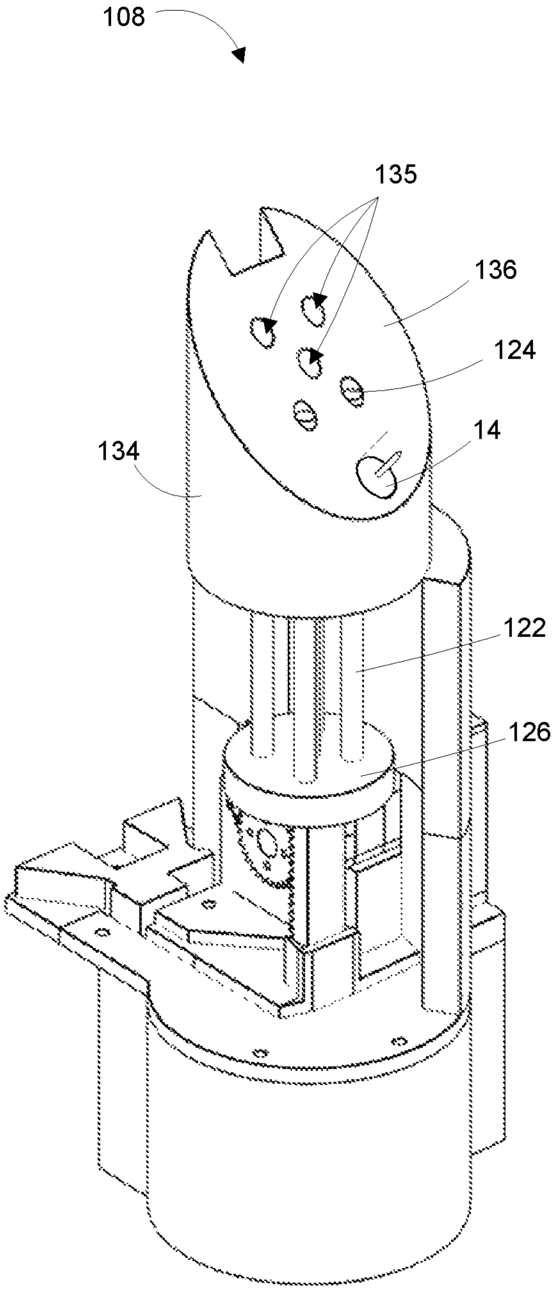

Having described various components and mechanisms of the tag removal device 100, the operation of the pin retractor mechanism 108 and the release frame mechanism 110 is described with respect to FIGS. 11A-13. FIGS. 11A and 11B show the pin retractor mechanism 108 in extended and retracted states, respectively. Once a security tag 10 is positioned against the magnet 120 and the article is detected, the retractor actuator 130 moves the retractor rods 122 and associated retractor magnets 124 upward toward the magnet 120 to capture the retainer pin 14. The retractor actuator 130 then moves the retractor rods 122 toward the retracted position (FIG. 11B), whereby the retractor magnets 124 are moved into the collar 134 through apertures 135, wherein the retainer pin 14 is moved away from, or stripped from, the retractor magnets 124 thereby releasing the retainer pin 14 from the retractor magnets 124, as shown in FIG. 11B. Once the retainer pin 14 is released from the retractor magnets 124, it slides off the angled surface 136 under the force of gravity. In other devices configured in accordance with embodiments of the present technology, the pin retractor can comprise a grasping mechanism or robotic end effector to grasp or otherwise capture the retainer pin 14.

Figure 12B:
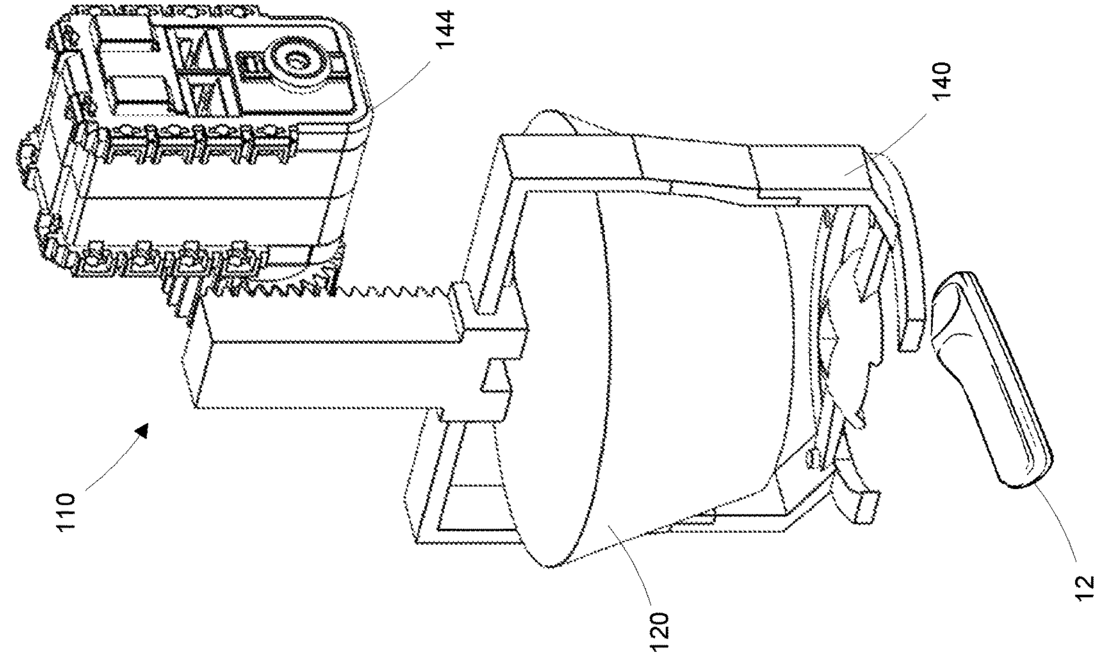
FIGS. 12A and 12B are partially assembled isometric views illustrating the operation of a release frame mechanism for the device shown in FIGS. 1-3.
Figure 12A:
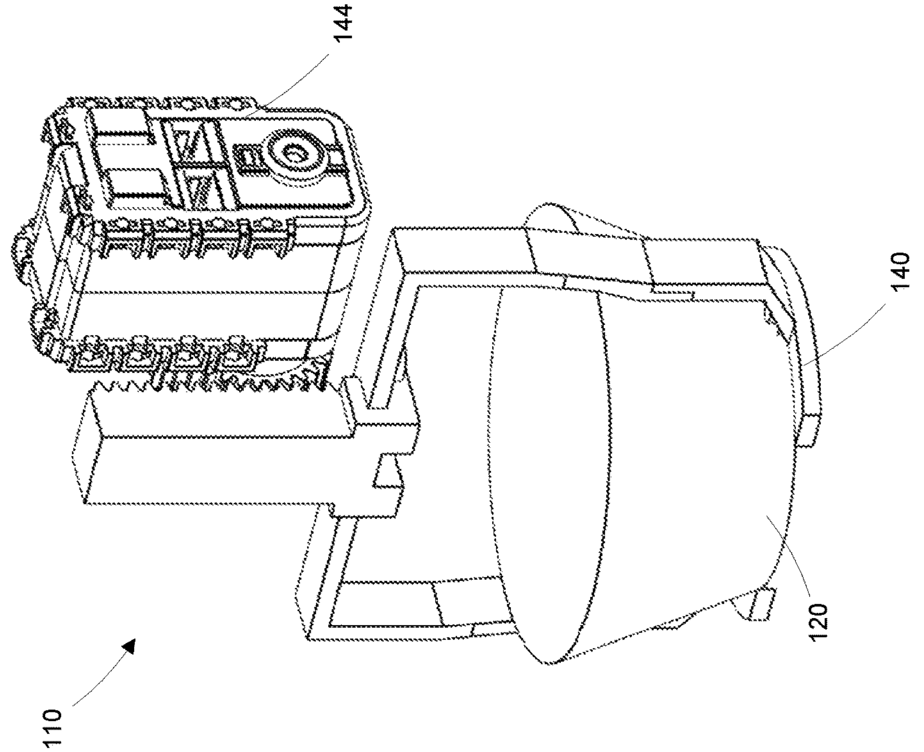

Moving to FIGS. 12A and 12B, once the retainer pin 14 is retracted from the tag body 12 and the article is removed from the device 100, the frame actuator 144 can be activated to release the tag body 12 from the magnet 120. In order to remove the tag body 12 from the magnet 120, the actuator 144 moves the release frame 140 from a first position (FIG. 12A) proximate the magnet 120, wherein the magnet 120 retains the tag body 12, to a second position (FIG. 12B) wherein the tag body 12 is moved away from the magnet 120, thereby releasing the tag body 12 from the magnet 120.

Figure 13:
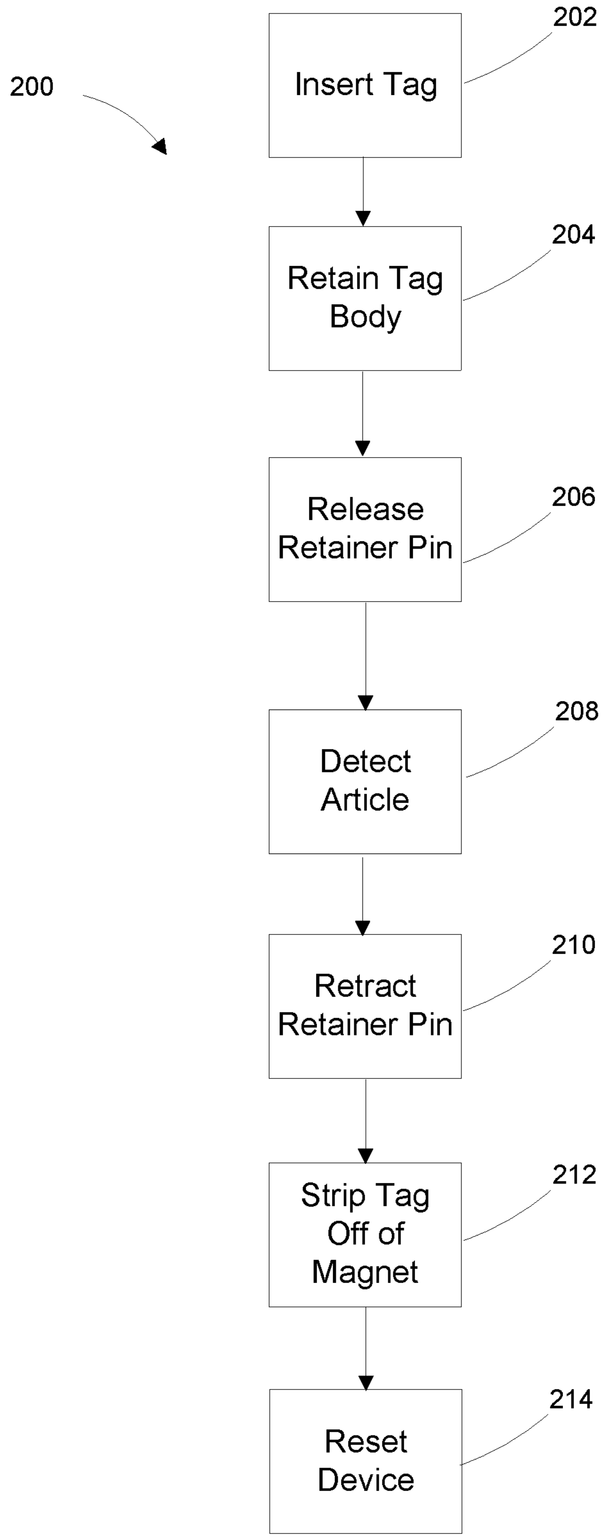
FIG. 13 is a flow diagram showing a method of operation for automatically removing a security tag in accordance with embodiments of the present technology.

FIG. 13 is a flow diagram showing a method of operation 200 for removing a security tag from an article in accordance with embodiments of the present technology. The method 200 starts at 202 when a user (e.g., customer) inserts a security tag (e.g., security tag 10) into the opening 106 (FIG. 1) of the security tag removing device (e.g., device 100). The tag body 12 is retained against the release frame 140 and the retainer pin 14 is released from the tag body 12 by the magnet 120 at 204 and 206, respectively. In some implementations, 204 and 206 can occur at the same time. At 208, the presence of the article can be detected which initiates removal of the retainer pin 14. At 210, the retainer pin 14 can be pulled or retracted from the tag body 12. At 212, the tag body 12 is released from the magnet 120 by moving the release frame 140 to the second position away from the magnet 120 (FIG. 12B), whereby the tag body 12 is moved away from the magnet 120. At 214, once the security tag is removed, the device 100 is reset to a state in which it is ready to receive another security tag. In some implementations, resetting the device 100 can include positioning the release frame 140 in the first position proximate the magnet 120 (FIG. 12A).

In some implementations, the controller 150 (FIG. 3) can be configured to execute the steps of method 200. For example, in a system in accordance with embodiments of the present technology, at least one memory device can store instructions for causing at least one processor to receive information from the one or more sensors 156 indicating the presence of the article in the opening 106; activate the retractor actuator 130 to move the pin retractor 108 away from the magnet 120, thereby retracting the retainer pin 14 from the tag body 12; and activate the frame actuator 144 to move the release frame 140 away from the magnet 120, whereby the tag body 12 is moved away from the magnet 120 thereby releasing the tag body 12 from the magnet 120.

II. SUITABLE SYSTEM

The techniques disclosed here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to cause a computer, a microprocessor, processor, and/or microcontroller (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 14:
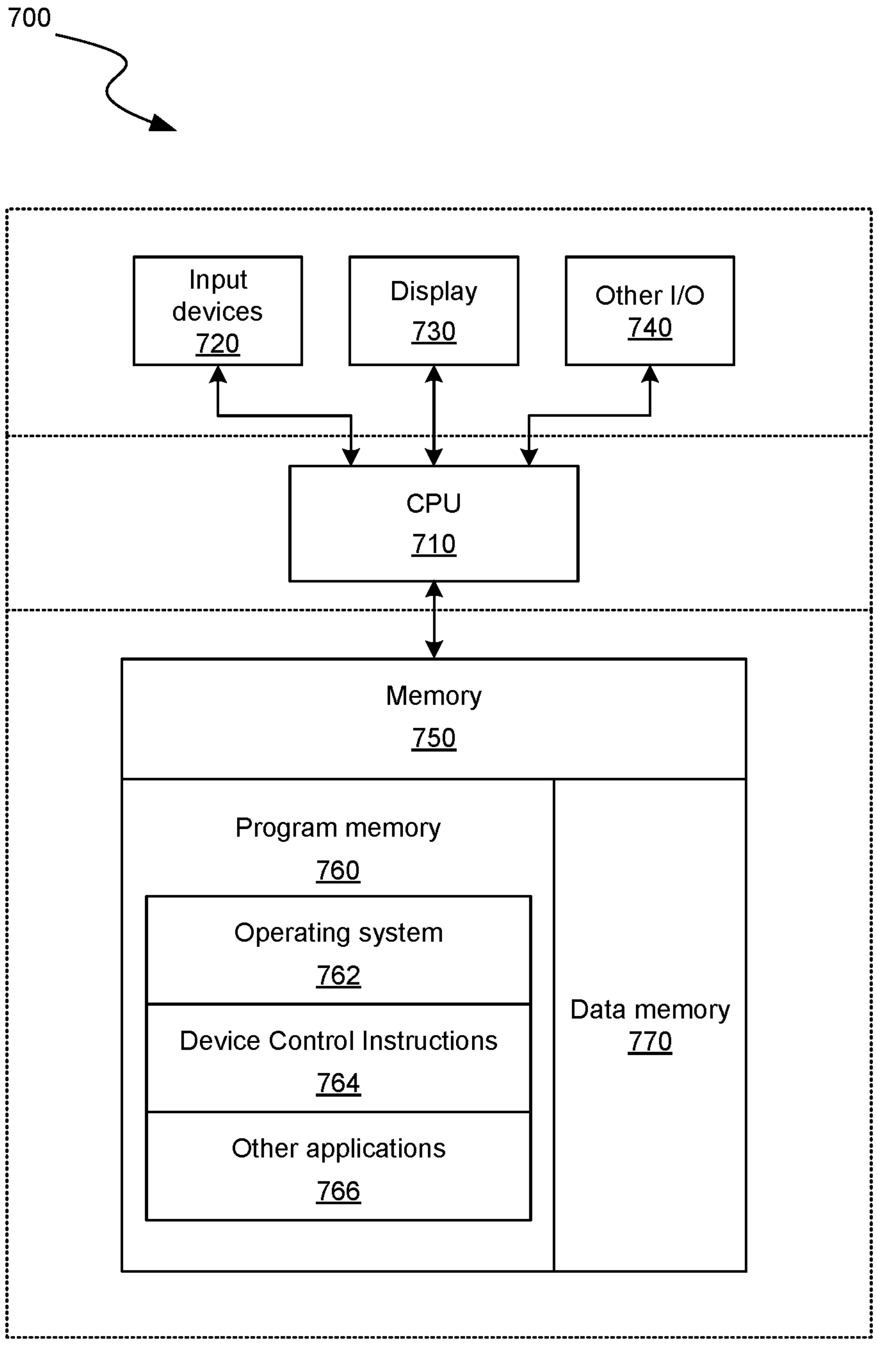
FIG. 14 is a block diagram illustrating an overview of devices on which some implementations of the present technology can operate.

FIG. 14 is a block diagram illustrating an overview of devices on which some implementations of the disclosed technology can operate. The devices can comprise hardware components of a device 700 that controls a device for removing a security tag. Device 700 can include one or more input devices 720 that provide input to the CPU (processor) 710, notifying it of actions. The actions are typically mediated by a hardware controller that interprets the signals received from the input device and communicates the information to the CPU 710 using a communication protocol. Input devices 720 include, for example, a mouse, a keyboard, a touchscreen, various sensors (e.g., sensors 156), a touchpad, a wearable input device, a camera- or image-based input device, a microphone, or other user input devices.

CPU 710 can be a single processing unit or multiple processing units in a device or distributed across multiple devices. CPU 710 can be coupled to other hardware devices, for example, with the use of a bus, such as a PCI bus or SCSI bus. The CPU 710 can communicate with a hardware controller for devices, such as for a display 730. Display 730 can be used to display text and graphics. In some examples, display 730 provides graphical and textual visual feedback to a user. In some implementations, display 730 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 740 can also be coupled to the processor, such as a network card, video card, audio card, USB, FireWire or other external device, camera, printer, speakers, CD-ROM drive, DVD drive, disk drive, or Blu-Ray device.

In some implementations, the device 700 also includes a communication device capable of communicating wirelessly or wire-based with a network node. The communication device can communicate with another device or a server through a network using, for example, TCP/IP protocols. Device 700 can utilize the communication device to distribute operations across multiple network devices.

The CPU 710 can have access to a memory 750. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 750 can include program memory 760 that stores programs and software, such as an operating system 762, device control instructions 764, and other application programs 766. Memory 750 can also include data memory 770 that can include timing information, sensor and actuator calibrations, etc., which can be provided to the program memory 760 or any element of the device 700.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 15:
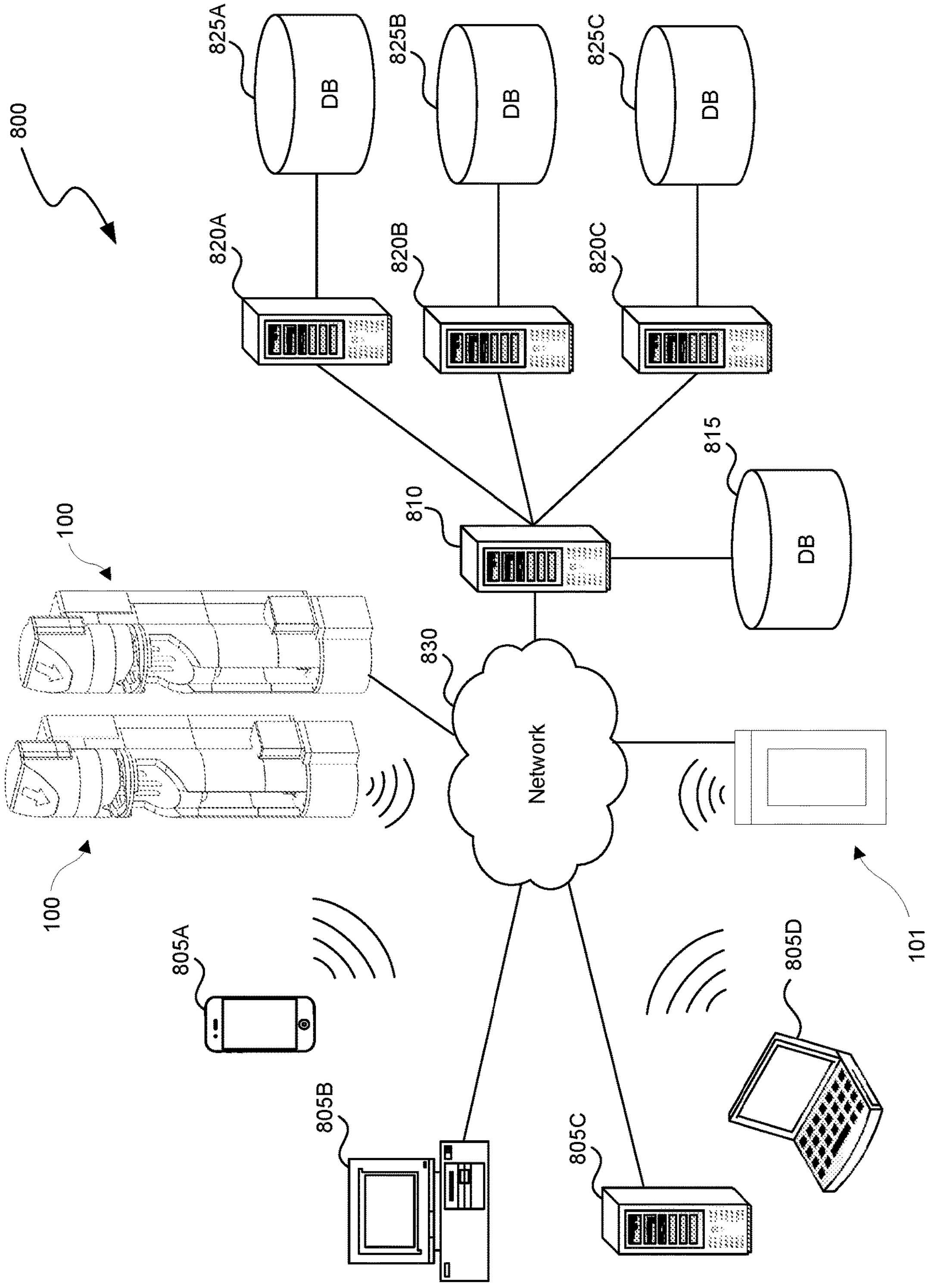
FIG. 15 illustrates an overview of an environment in which some implementations of the present technology can operate.

FIG. 15 is a block diagram illustrating an overview of an environment 800 in which some implementations of the disclosed technology can operate. Environment 800 can include one or more automatic security tag removal devices 100 and one or more POS systems 101. Environment 800 can also include one or more client computing devices 805A-D, examples of which can include device 700. The automatic security tag removal devices 100, POS systems 101, and client computing devices 805 can operate in a networked environment using logical connections through network 830 to one or more remote computers, such as a server computing device 810.

In some implementations, server computing device 810 can be an edge server that receives client requests and coordinates fulfillment of those requests through other servers, such as servers 820A-C. Server computing devices 810 and 820 can comprise computing systems, such as device 700. Though each server computing device 810 and 820 is displayed logically as a single server, server computing devices can each be a distributed computing environment encompassing multiple computing devices located at the same or at geographically disparate physical locations. In some implementations, each server computing device 820 corresponds to a group of servers.

Client computing devices 805 and server computing devices 810 and 820 can each act as a server or client to other server/client devices. Server 810 can connect to a database 815. Servers 820A-C can each connect to a corresponding database 825A-C. As discussed above, each server 820 can correspond to a group of servers, and each of these servers can share a database or can have their own database. Databases 815 and 825 can warehouse (e.g., store) information such as customer data, pricing information, POS information, inventory data, security tag data, etc. Though databases 815 and 825 are displayed logically as single units, databases 815 and 825 can each be a distributed computing environment encompassing multiple computing devices, can be located within their corresponding server, or can be located at the same or at geographically disparate physical locations.

Network 830 can be a local area network (LAN) or a wide area network (WAN), but can also be other wired or wireless networks. Network 830 may be the Internet or some other public or private network. Client computing devices 805 can be connected to network 830 through a network interface, such as by wired or wireless communication. While the connections between server 810 and servers 820 are shown as separate connections, these connections can be any kind of local, wide area, wired, or wireless network, including network 830 or a separate public or private network.

Figure 16:
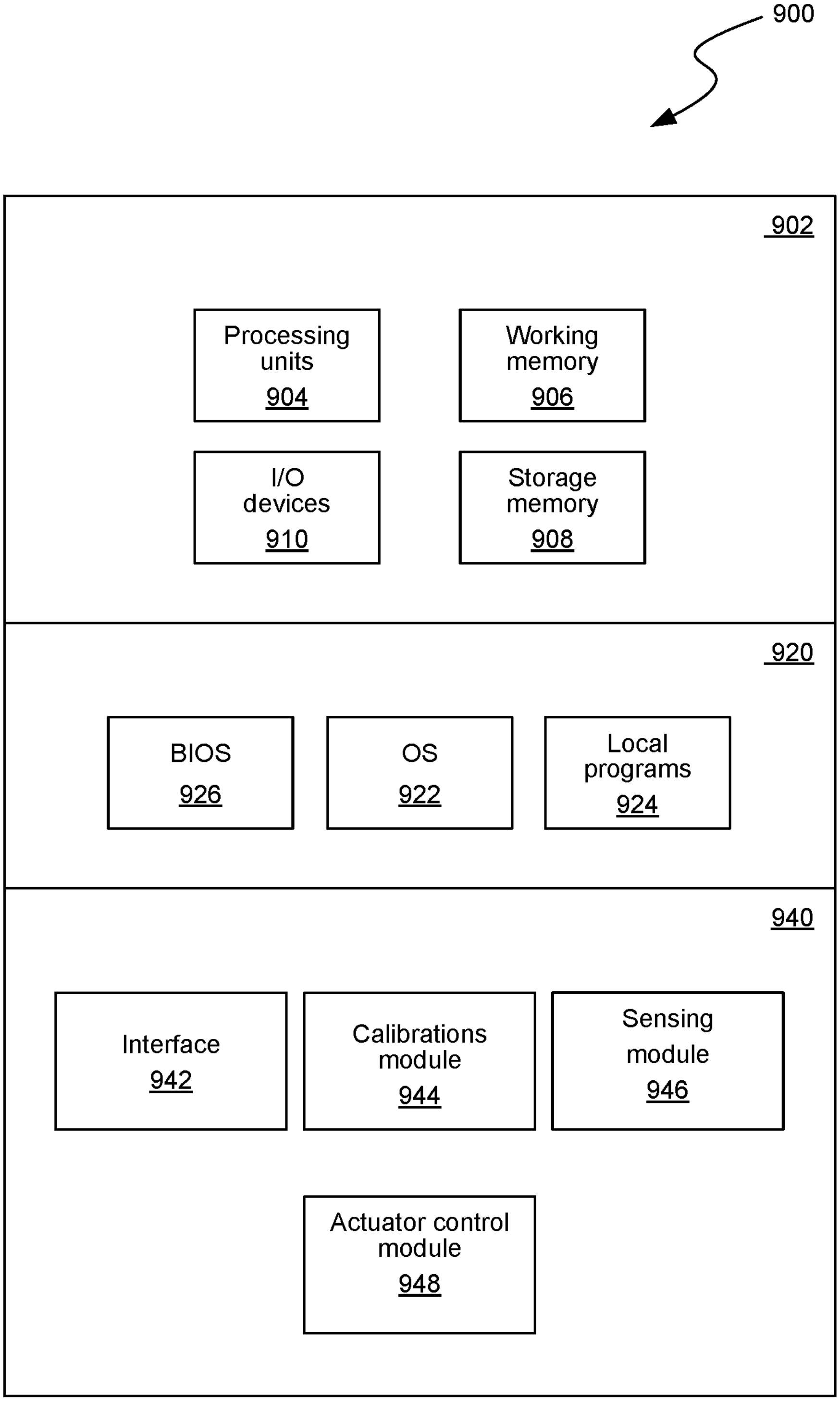
FIG. 16 is a block diagram illustrating components which, in some implementations, can be used in a system employing the disclosed technology.

FIG. 16 is a block diagram illustrating components 900 which, in some implementations, can be used in a system employing the disclosed technology. The components 900 include hardware 902, general software 920, and specialized components 940. As discussed above, a system implementing the disclosed technology can use various hardware, including processing units 904 (e.g., CPUs, GPUs, APUs, etc.), working memory 906, storage memory 908, and input and output devices 910. Components 900 can be implemented in a client computing device such as client computing devices 805 or on a server computing device, such as server computing device 810 or 820.

General software 920 can include various applications, including an operating system 922, local programs 924, and a basic input output system (BIOS) 926. Specialized components 940 can be subcomponents of a general software application 920, such as local programs 924. Specialized components 940 can include calibrations module 944, sensing module 946, actuator control module 948, and components that can be used for transferring data and controlling the specialized components, such as interface 942. In some implementations, components 900 can be in a computing system that is distributed across multiple computing devices or can be an interface to a server-based application executing one or more of specialized components 940.

Those skilled in the art will appreciate that the components illustrated in FIGS. 14-16 described above, and in each of the flow diagrams discussed above, may be altered in a variety of ways. For example, the order of the logic may be rearranged, sub steps may be performed in parallel, illustrated logic may be omitted, other logic may be included, etc.

Figure 17A:
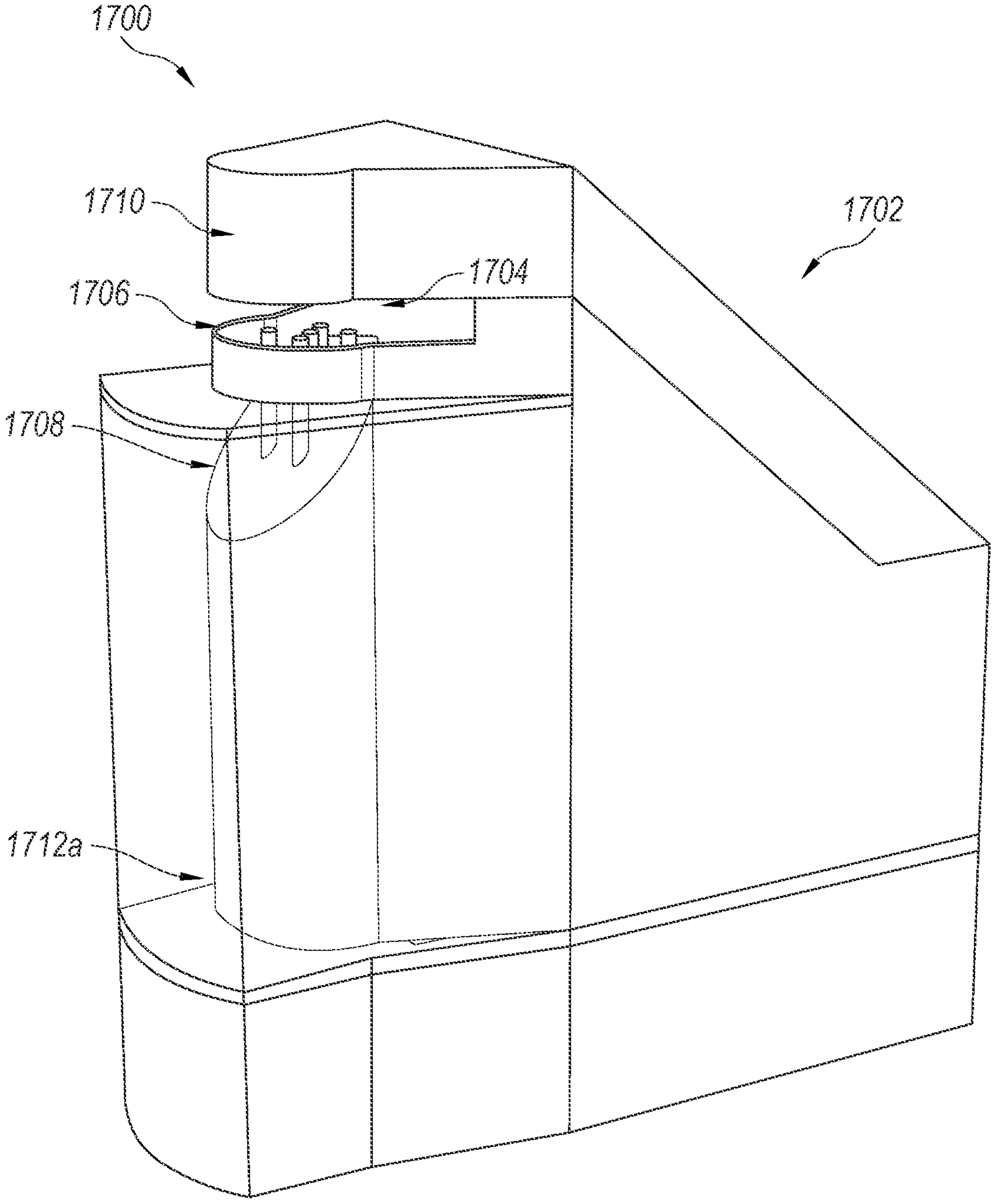
FIG. 17A is an isometric view of a tag removal device configured in accordance with some embodiments of the present technology.
Figure 17B:
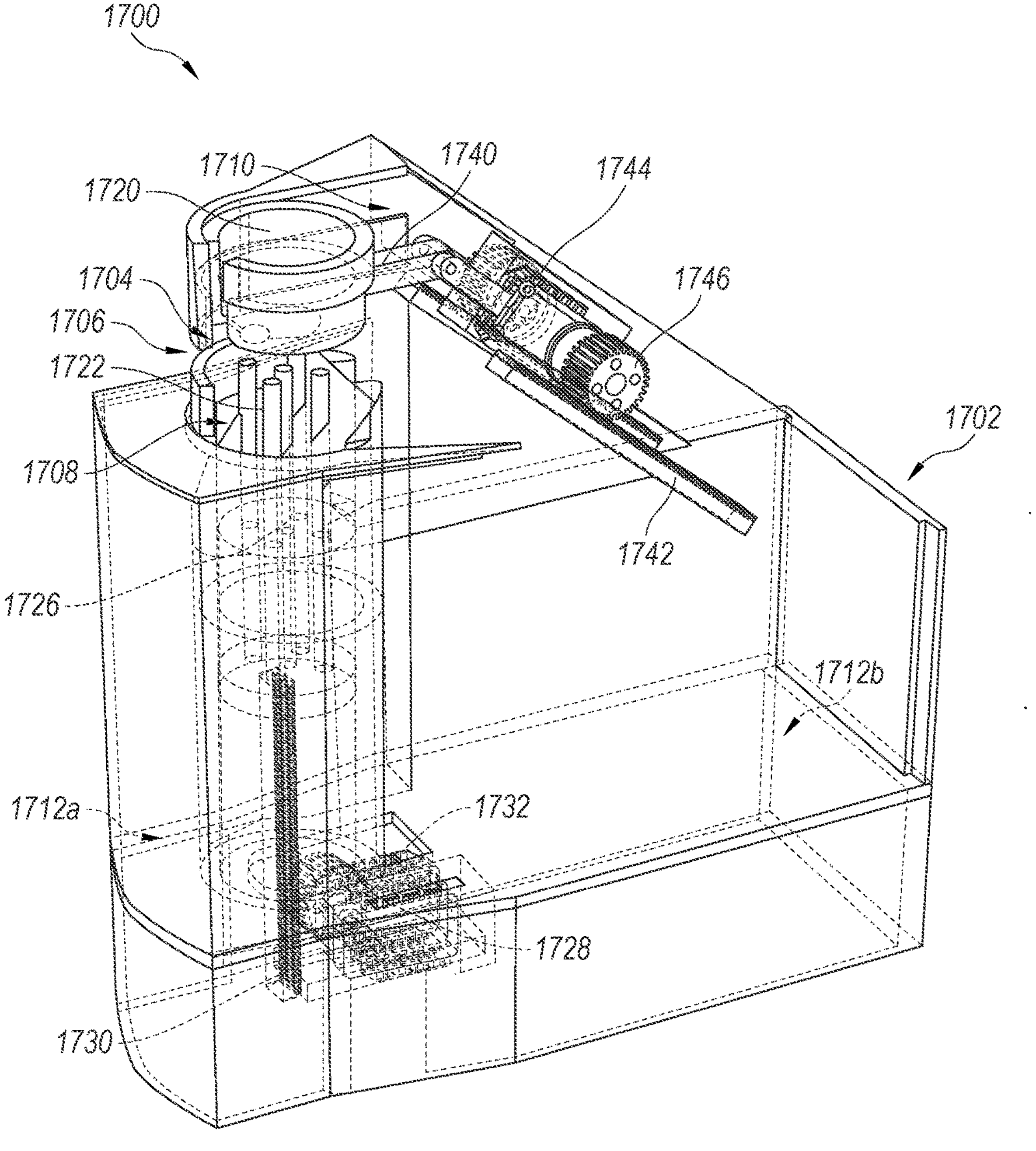
FIGS. 17B and 17C are partial cutaway side views of the tag removal device of FIG. 17A.
Figure 17C:
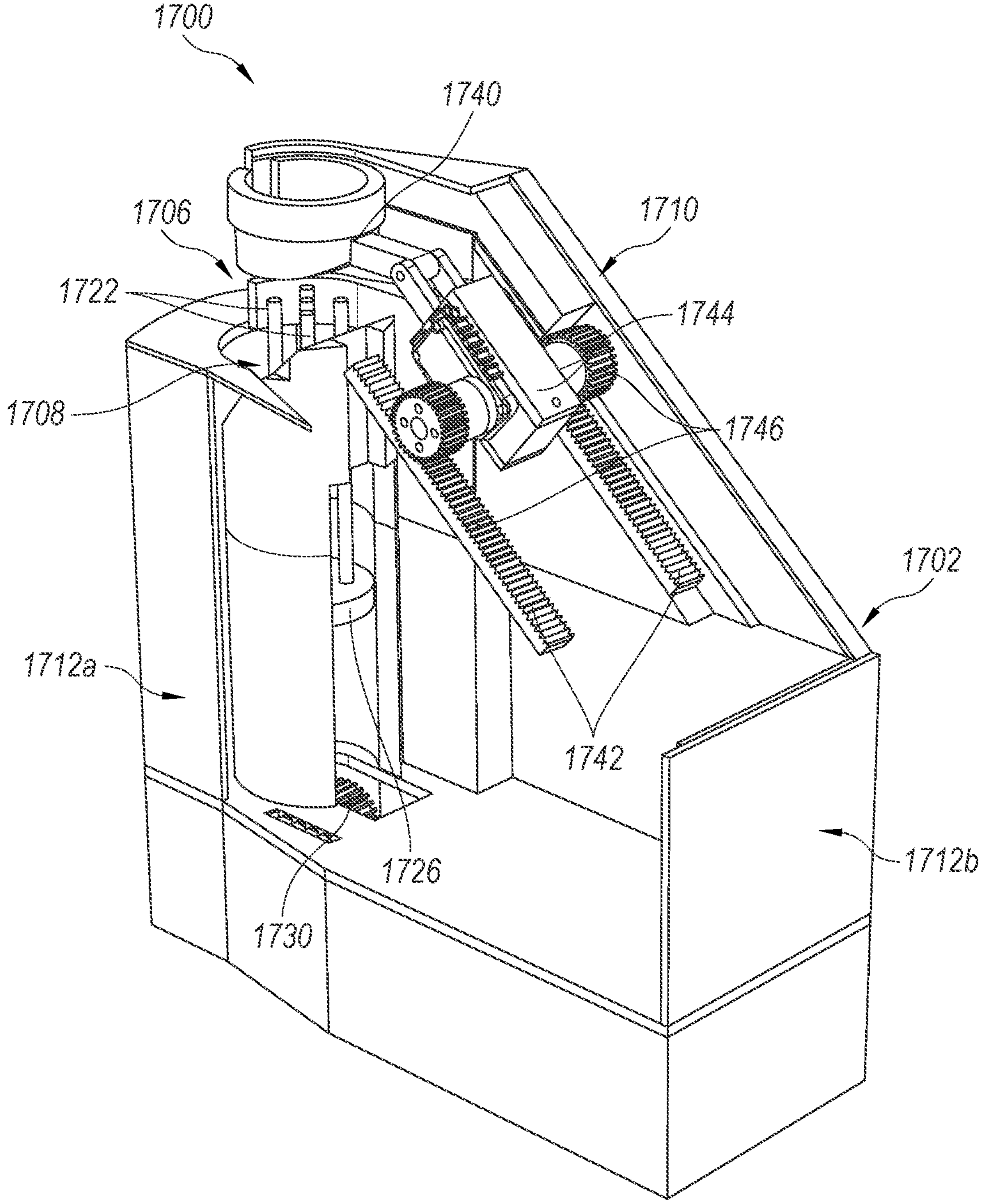
Figure 17D:
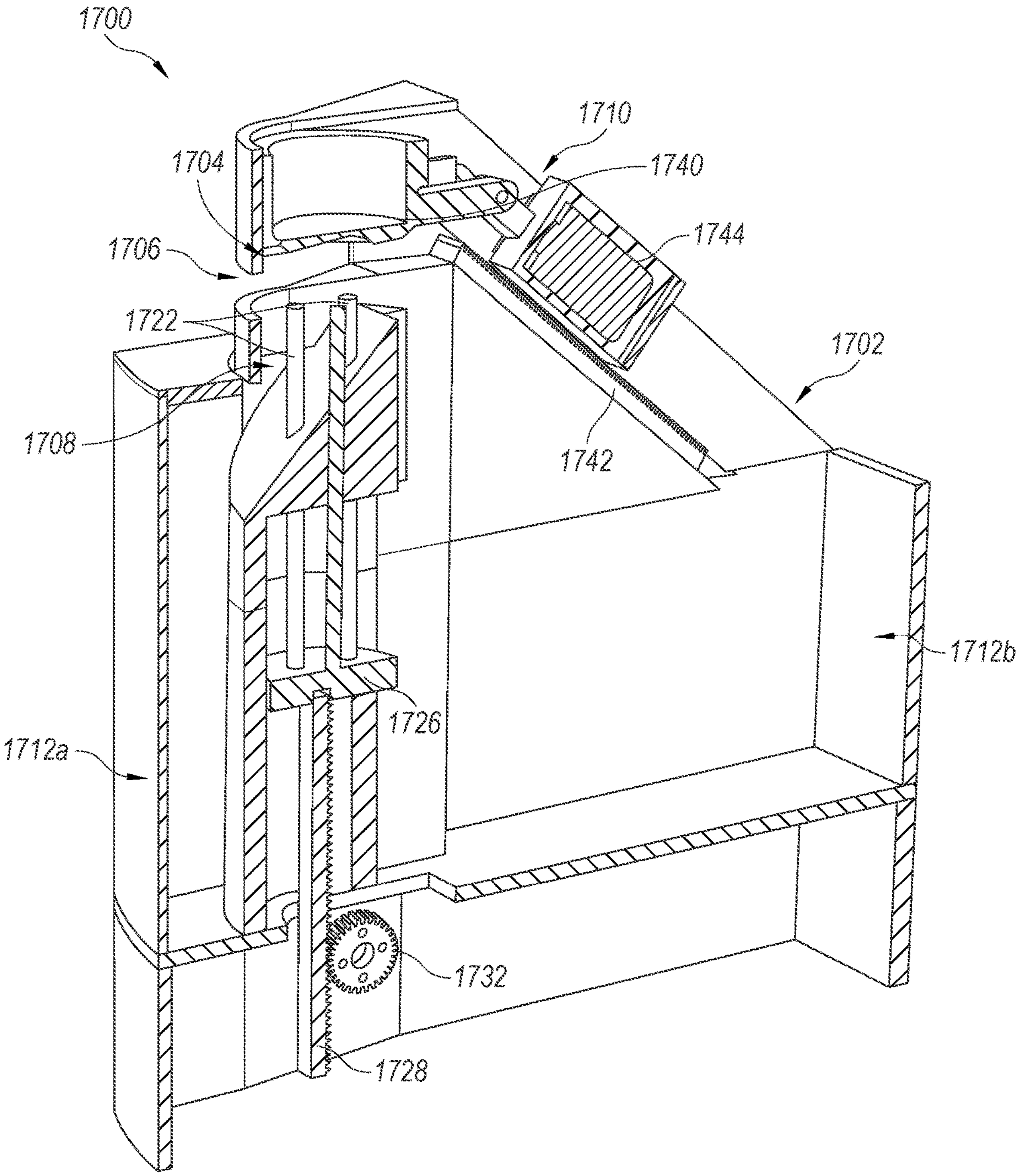
FIG. 17D is a further cutaway side view of the tag removal device of FIG. 17B.

FIG. 17A is an isometric view of a tag removal device 1700 ("device 1700") configured in accordance with some embodiments of the present technology, and FIGS. 17B-17D are partial cutaway side views of the tag removal device of FIG. 17A. The device 1700 can include various features at least generally similar to the features of the device 100 described above with respect to FIGS. 1-12B. For example, referring to FIGS. 17A-17D together, the device 1700 includes a housing 1702, a tag guide 1704, an opening 1706 positioned to receive a security tag (e.g., the security tag 10 of FIG. 1, other EAS security tags), a pin retractor mechanism 1708 for removing a first portion (e.g., a retainer pin) of the tag, a release frame mechanism 1710 for securing and removing a second portion of the tag (e.g., a tag body), and at least one collection bin (identified individually as a first collection bin 1712*a* and a second collection bin 1712*b*) for receiving portions of removed security tags (e.g., the tag body 12 of FIG. 1, the retainer pin 14 of FIG. 1, and/or other components of removed security tags). As shown best in FIG. 17D, the first collection bin 1712*a* can be positioned to receive retainer pins, the second collection bin 1712*b* can be positioned to receive tag bodies, and the two collection bins 1712*a*, 1712*b* can be separated from each other by a divider wall and/or other device components to sort the different portions of the removed security tag.

Referring to FIGS. 17B-17D, a magnet 1720 can be positioned proximate to the opening 1706 such that, when a security tag is inserted into the opening 1706, the magnet 1720 retains the tag body and provides for the release of the retainer pin (or other portion opposite the tag body) from the tag body. The pin retractor mechanism 1708 is positioned in the housing 1702 opposite the magnet 1720 and is operative to capture the retainer pin and retract it from the tag body. The pin retractor mechanism 1708 can include one or more retractor rods 1722 (e.g., two, three, four, five, or more rods), each including a retractor magnet positioned on a distal end thereof. The retractor rods 1722 can be carried on a base plate 1726 which is in turn moved toward or away from (e.g., up or down; various positions illustrated in FIG. 17B) the magnet 1720 by activating an actuator (coupled to or integrated with a motor), such as a rotary actuator 1730. The actuator 1730 is coupled to the base plate 1726 via a pinion gear 1732 and a gear rack 1728 engaging the pinion gear 1732. In some embodiments, the actuator 1730 can impart movement on the retractor rods 1722 and/or other portions of the pin retractor mechanism 1708 using other suitable means, and/or be coupled to the retractor rods 722 via linkages, levers, and/or other suitable connectors.

The release frame mechanism 1710 includes a release frame 1740 positioned proximate the magnet 1720 and movable between a first position at the opening 1706 wherein the magnet 1720 retains the tag body (shown in FIGS. 17B-17D), and a second position wherein the tag body is moved away from the magnet 1720, thereby releasing the tag body from the magnet 1720. A frame actuator (coupled to or integrated with a motor), such as rotary actuator 1744, can be coupled to the release frame 1740 for moving the release frame between the first and second positions. The frame actuator 1744 can be coupled to one or more pinion gears 1746, and one or more gear racks 1742 engaging the pinion gear and coupled to the release frame 1740. In some embodiments, the actuator 1740 can impart movement on the release frame 1740 and/or other portions of the release frame mechanism 1710 using other suitable means, and/or be coupled to the release frame 1740 via linkages, levers, and/or other suitable connectors.

Unlike the purely vertical movement of the release frame mechanism 110 described above with respect to FIGS. 1-12B which rises upwardly to remove the tag body, the release frame mechanism 1710 retracts from the opening 1706 (i.e., along a horizontal plane away from the opening and the garment therein) and at a downward angle such that the tag body moves backwards into the housing and drops down into the second collection bin 1712*b*. In the illustrated embodiment, for example, the gear rack 1742 extends downwardly at an acute angle from the horizontal plane of the opening 1706 as the release frame mechanism 1710 moves to the second position to release the tag body. This configuration allows the tag body to be removed from the item and released from the release frame mechanism 1710 (into the capture bin 112*b*) without the item needing to be removed from the opening 1706. This embodiment also creates an overall lower profile of the device 1700 because there is less vertical rise necessary to capture the tag body. For example, the device 1700 can be installed in a counter or other structure such that the opening 1706 is flush or just above the horizontal surface of the adjacent counter and only the lower profile release frame mechanism 1710 and the associated portion of the housing structure rises there above. As such, the device 1700 may increase the efficiency (e.g., speed) at which tags are removed and have a smaller vertical profile. The device 1700 may also provide for differing motor configurations, such as a single motor controlling both actuators. As used herein, directional terms, such as "vertical," "horizontal," "backwards," and the like are used for ease with respect to the orientation shown in the drawings, though different orientations (e.g., a side-oriented tag removal device) are also encompassed herein).

Figure 18:
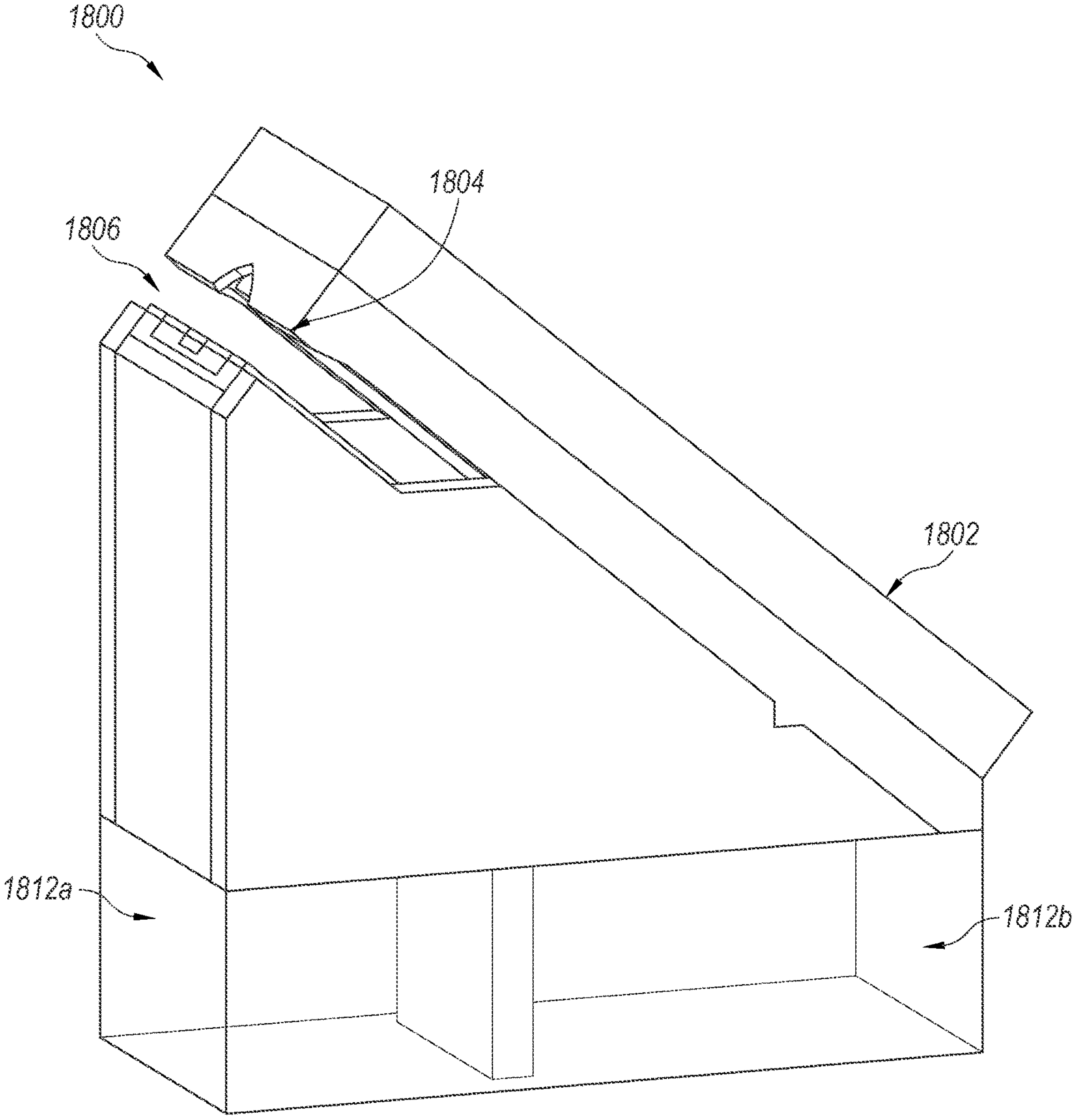
FIG. 18 is an isometric view of a tag removal device configured in accordance with some embodiments of the present technology.

FIG. 18 is an isometric view of a tag removal device 1800 ("device 1800") configured in accordance with some embodiments of the present technology. The device 1800 can include various features at least generally similar to the features of the device 1700 described above with respect to FIGS. 17A-17D. For example, the device 1800 includes a housing 1802, a tag guide 1804, an opening 1806 positioned to receive a security tag (e.g., the security tag 10 of FIG. 1, other EAS security tags), a pin retractor mechanism (within the housing 1802) for removing a first portion (e.g., a retainer pin) of the tag, a release frame mechanism (within the housing 1802) for securing and removing a second portion of the tag (e.g., a tag body), and at least one collection bin (identified individually as a first collection bin 1812*a* and a second collection bin 1812*b*) for receiving portions of removed security tags (e.g., the tag body 12 of FIG. 1, the retainer pin 14 of FIG. 1, and/or other components of removed security tags). Similar to the embodiment of FIGS. 17A-17D, the device 1800 has a release frame mechanism that moves downwardly at an angle away from the opening 1806, retracting the tag body backwards into the housing 1802 and dropping it down into the second collection bin 1812*b*. This provides for an overall lower profile of the device 1800, as well as complete tag capture (i.e., removal and release) with the item is still in the opening 1806. Further, the device 1800 is configured such that the opening 1802 is positioned at an acute angle (i.e., angled downwardly) with respect to a horizontal plane (e.g., a counter) with the opposing frame removal and pin removal mechanisms being arranged accordingly therein. This configuration may further decrease the overall height of the device 1800, as well as allow for different motor configurations for driving tag removal (e.g., a single motor).

III. CONCLUSION

The above detailed description of embodiments of the technology are not intended to be exhaustive or to limit the technology to the precise forms disclosed above. Although specific embodiments of, and examples for, the technology are described above for illustrative purposes, various equivalent modifications are possible within the scope of the technology as those skilled in the relevant art will recognize. For example, although steps are presented in a given order, alternative embodiments may perform steps in a different order. The various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively.

As used herein, the phrase "and/or" as in "A and/or B" refers to A alone, B alone, and A and B. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with some embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein. The following examples provide further representative embodiments of the present technology.

What is claimed is:

1. A device for removing a security tag, having a tag body and a retainer pin, from an article, the device comprising:
- a housing including an opening positioned to receive the security tag and at least a portion of the article;
- a magnet supported in the housing adjacent the opening and operative to retain the tag body and to release the retainer pin from the tag body when the security tag is inserted into the opening;
- a pin retractor positioned in the housing opposite the magnet and operative to capture the retainer pin and separate the retainer pin from the tag body; and
- a release frame supported in the housing, the release frame positioned proximate the magnet and movable between a first position wherein the magnet retains the tag body, and a second position wherein the tag body is moved away from the magnet, thereby releasing the tag body from the magnet.

2. The device of claim 1, further comprising a frame actuator coupled to the release frame for moving the release frame between the first and second positions.

3. The device of claim 2, wherein the frame actuator comprises a rotary actuator coupled to a pinion gear, and a gear rack engaging the pinion gear and coupled to the release frame.

4. The device of claim 1, further comprising one or more sensors positioned proximate the opening.

5. The device of claim 1, wherein the pin retractor comprises one or more retractor rods, each including a retractor magnet positioned on a distal end thereof.

6. The device of claim 5, further comprising a rotary actuator coupled to a pinion gear, and a gear rack engaging the pinion gear and coupled to the one or more retractor rods.

7. The device of claim 5, further comprising a collar wherein the one or more retractor rods extend through the collar.

8. The device of claim 7, wherein the collar includes a surface oriented at an angle with respect to the one or more retractor rods.

9. The device of claim 1, further comprising:
- a collection bin for capturing portions of the security tag, the collection bin positioned on the same side of the opening as the pin retractor; and
- a frame actuator coupled to the release frame and configured to move the release frame between the first and second positions, wherein the frame actuator retracts the release frame away from the opening toward the collection bin.

10. The device of claim 1 wherein the release frame is configured to release the tag body into a retainer bin while the article is within the opening.

11. A system for removing a security tag, having a tag body and a retainer pin, from an article, the system comprising:
- a housing including an opening positioned to receive the security tag and at least a portion of the article;
- one or more sensors positioned proximate the opening;
- a magnet supported in the housing adjacent the opening and operative to retain the tag body and to release the retainer pin from the tag body when the security tag is inserted into the opening;
- a pin retractor positioned in the housing opposite the magnet and operative to capture the retainer pin;
- a retractor actuator coupled to the pin retractor;
- a release frame supported in the housing and positioned proximate the magnet;
- a frame actuator coupled to the release frame; and
- at least one memory device storing instructions for causing at least one processor to:
  - receive information from the one or more sensors indicating the presence of the article in the opening;
  - activate the retractor actuator to move the pin retractor away from the magnet, thereby separating the retainer pin from the tag body; and
  - activate the frame actuator to move the release frame away from the magnet, whereby the tag body is moved away from the magnet thereby releasing the tag body from the magnet.

12. The system of claim 11, wherein the frame actuator comprises a rotary actuator coupled to a pinion gear, and a gear rack engaging the pinion gear and coupled to the release frame.

13. The system of claim 11, wherein the pin retractor comprises one or more retractor rods, each including a retractor magnet positioned on a distal end thereof.

14. The system of claim 13, further comprising a rotary actuator coupled to a pinion gear, and a gear rack engaging the pinion gear and coupled to the one or more retractor rods.

15. The system of claim 13, further comprising a collar wherein the one or more retractor rods extend through the collar and wherein activating the retractor actuator to move the pin retractor away from the magnet includes moving the retractor magnets into the collar, wherein the retainer pin is moved away from the retractor magnets thereby releasing the retainer pin from the retractor magnets.

16. The system of claim 15, wherein the collar includes a surface oriented at an angle with respect to the one or more retractor rods.

17. A method for removing a security tag, having a tag body and a retainer pin, from an article, the method comprising:

positioning a release frame in a first position proximate a magnet, wherein the release frame and the magnet are supported in a housing;

retaining the tag body against the release frame with the magnet;

releasing the retainer pin from the tag body with the magnet;

separating the retainer pin from the tag body; and moving the release frame to a second position away from the magnet, whereby the tag body is moved away from the magnet thereby releasing the tag body from the magnet.

18. The method of claim 17, further comprising sensing the presence of the article prior to retracting the retainer pin from the tag body.

19. The method of claim 17, further comprising returning the release frame to the first position.

20. The method of claim 17, wherein retracting the retainer pin includes capturing the retainer pin with one or more retractor magnets and moving the magnets away from the tag body.

* * * * *